(12) United States Patent
Nokkonen

(10) Patent No.: US 7,395,440 B2
(45) Date of Patent: *Jul. 1, 2008

(54) POWER MANAGEMENT

(75) Inventor: Erkki Nokkonen, Tampere (FI)

(73) Assignee: Nokia Corporation, Espoo (FI)

( * ) Notice: Subject to any disclaimer, the term of this patent is extended or adjusted under 35 U.S.C. 154(b) by 332 days.

This patent is subject to a terminal disclaimer.

(21) Appl. No.: 10/967,097

(22) Filed: Oct. 15, 2004

(65) Prior Publication Data

US 2006/0085654 A1    Apr. 20, 2006

(51) Int. Cl.
*G06F 1/00*    (2006.01)
*G06F 1/32*    (2006.01)
*G06F 1/26*    (2006.01)

(52) U.S. Cl. .................. 713/300; 713/300; 713/320

(58) Field of Classification Search .......... 713/300–340
See application file for complete search history.

(56) References Cited

U.S. PATENT DOCUMENTS 5,815,409 A * 9/1998 Lee et al. ............... 700/286

* cited by examiner

*Primary Examiner*—Nitin C. Patel
(74) *Attorney, Agent, or Firm*—Ware, Fressola, Van Der Sluys & Adolphson, LLP

(57) ABSTRACT

The invention relates to an electronic device comprising at least two power management circuits and a signal line connecting the circuits. Each of the circuits is adapted to control a power supply to at least one functional component of the electronic device. Each of the circuits is adapted to detect a condition which requires powering down functional components of said electronic device and to set the signal line to a predetermined state, in case the circuit detects a condition which requires a powering down of the electronic device. Further, each of the circuits is adapted to monitor a state of the signal line and to power down all functional components associated to it upon detection of the predetermined state of the signal line.

14 Claims, 4 Drawing Sheets

POWER MANAGEMENT

FIELD OF THE INVENTION

The invention relates to an electronic device comprising at least two power management circuits. The invention relates equally to a corresponding power management circuit, to a chip comprising such a power management circuits and to a method of operating such an electronic device.

BACKGROUND OF THE INVENTION

A power management circuit is a circuit which controls the power supply to at least one functional component of an electronic device. If a device comprises a plurality of functional components, a dedicated power management circuit may be associated to each of these functional components.

For example, a cellular terminal usually comprises a cellular modem as a first functional component, an application engine as a second functional component, etc. The term application engine refers to the "motor" of a terminal. It may comprise the application processor and related memory components, including the core software, hardware drivers, low level software and operating system, as well as related power management components and interfaces to peripherals like display, camera, keyboard, Bluetooth™ module, etc., even to the cellular modem. The application engine does not contain the mentioned peripherals, though. The idea behind the use of such an application engine is that it allows constructing many kinds of terminals using the same core components but varying for example the user interfaces, like display and keyboard. In general, it enables the construction of products that look quite different and have different features but that use the same technology inside.

Each of the functional components may be realized for instance on a separate chip, and each chip may comprise a power management circuit. Each power management circuit can be realized for instance in form of an Integrated Circuit (IC) or an Application Specific Integrated Circuit (ASIC).

In case a plurality of power management circuits are present, one of the circuits is normally defined to be a master circuit, while the other circuits are defined to be slave circuits. The master circuit controls the power-up and down of the entire system. This can be realized with an enable signal which is controlled by the master circuit and which can be detected by the slave circuits. Whenever the enable signal becomes active, the slave circuits cause the associated functional components to be powered up, and whenever the enable signal becomes inactive, the slave circuits cause the associated functional components to be powered down.

Typically, a power management circuit also comprises a thermal shut-down function. That is, in case the temperature of an associated functional component or of a chip comprising the associated functional component rises too high, the power management circuit forces the component to power off, in order to prevent a destruction of the component.

Abnormal heating may be caused by many reasons, for example by an overload on some regulator, a short circuit, high ambient temperature, or even a crash of the system software.

The temperature can be sensed by a sensor. Such a sensor is normally integrated on a single chip together with the power management circuit. Usually, such a sensor monitors two limits. The lower limit is a warning limit and the higher limit is the actual shut-down limit.

In case a sensor detects that the warning limit is exceeded, it informs an associated power management circuit that the chip temperature has started to rise too high. The power management circuit provides thereupon a warning to a system processor, for example in the form of an interrupt. The system processor will then turn the system off in a controlled manner. To this end, it requests the master power management circuit to shut down the system. The master circuit deactivates thereupon the enable signal and shuts down the power for the functional component or components associated to the master circuit. The slave circuits detect the deactivation of the enable signal and shut down the power for the components associated to the slave circuits.

In some situations, however, the monitored temperature may exceed the shut-down limit before the system processor is able to turn the system off in a controlled manner. For instance, in case of a particularly fast increase of temperature upon a sudden short circuit, etc., the software of the system processor might not have enough time to react. Moreover, the system processor might suffer a crash after which the software is no longer functional and thus fails to power down the system. In cases in which the monitored temperature rises very fast above the shutdown limit, the concerned power management circuit should therefore force the associated functional component autonomously to power down, before hardware damage occurs. In a possible implementation, for example, a power management circuit causes a shut down of an associated functional component, if an interrupt provided to the system processor is not acknowledged within a certain time limit.

Whenever there are multiple power management circuits in an electronic device, each of these power management circuits is capable of interrupting the system processor due to a detected rising temperature.

A problem may arise in a situation, in which a slave power management circuit detects an overheating, and in which the system software has crashed or is unable to respond to an interrupt by the slave circuit for some other reason, or the temperature rises so fast that the system software has not enough time to react.

If only one of the slave circuits detects a temperature rising above the shut-down limit, a situation may occur in which one component is switched off, while one or more other components remain switched on, that is, the power down of the system is not complete. In a cellular terminal, for example, it might happen that the cellular modem is still powered on, while the application engine has shut down. This, in turn, is a non-allowed system state, which can have unpredictable consequences and even result in hardware damage. At least a weird behavior might be seen by the user of the electronic device.

SUMMARY OF THE INVENTION

It is an object of the invention to improve the shut-down of the power supply to components of an electronic device.

An electronic device is proposed which comprises at least two power management circuits and a signal line connecting the at least two power management circuits. Each of the at least two power management circuits is adapted to control a power supply to at least one functional component of the electronic device associated to the power management circuit. Each of the at least two power management circuits is further adapted to detect a condition which requires powering down functional components of the electronic device. Each of the at least two power management circuits is further adapted to set a signal line to a predetermined state, in case the power management circuit detects a condition which requires powering down functional components of the electronic device.

Each of the at least two power management circuits is further adapted to monitor a state of the signal line. Finally, each of the at least two power management circuits is adapted to power down all functional components associated to it upon detection of the predetermined state of the signal line.

Moreover, a power management circuit is proposed which comprises a signal line terminal enabling a connection to a signal line and a power supply terminal enabling a control of a power supply to a functional component associated to the power management circuit. The power management circuit is adapted to detect a condition which requires powering down a functional component associated to the power management circuit. The power management circuit is further adapted to set a signal line connected to the signal line terminal to a predetermined state, in case the power management circuit detects a condition which requires powering down a functional component associated to the power management circuit. The power management circuit is further adapted to monitor a state of a signal line connected to the signal line terminal. Finally, the power management circuit is adapted to power down a functional component associated to the power management circuit upon detection of the predetermined state of a signal line connected to the signal line terminal.

Moreover, a chip is proposed, which comprises at least one functional component and a power management circuit adapted to control a power supply to the at least one functional component. The power management circuit is adapted to detect a condition which requires powering down the at least one functional component. The power management circuit is further adapted to set a signal line to a predetermined state, in case the power management circuit detects a condition which requires powering down the at least one functional component. The power management circuit is further adapted to monitor a state of a signal line. Finally, the power management circuit is adapted to power down the at least one functional component upon detection of the predetermined state of the signal line.

Moreover, a method for operating an electronic device comprising at least two power management circuits and a signal line interconnecting the at least two power management circuits is proposed. At least one functional component of the electronic device is associated to each of the at least two power management circuits, and each of the at least two power management circuits is adapted to control a power supply to the at least one associated functional component. The method comprises at one of the at least two power management circuits monitoring a state of the signal line. The method further comprises at one of the at least two power management circuits monitoring an entry of a condition which requires powering down functional components of the electronic device and setting the signal line to a predetermined state, in case a condition which requires powering down functional components of the electronic device is detected. Finally, the method comprises at one of the at least two power management circuits powering down all functional components associated to the power management circuit upon detection of the predetermined state of the signal line.

The invention is based on the idea that each of a plurality of power management circuits of an electronic device should be able on the one hand to generate a power down signal for other power management circuits and on the other hand to receive a power down signal from any other power management circuit. In contrast to known solutions, any power management circuit, including a slave power management circuit, can thus directly cause a switch off of functional components by other power management circuits, and any power management circuit, including a master power management circuit, can receive an indication about a required switch off directly from any slave circuit.

It is an advantage of the invention that it makes an electronic device more robust, since it allows ensuring a reliable complete switch off of the device, even in emergency cases. The invention allows in particular avoiding that some functional components are switched off while others remain switched on at the same time, for example due to software delay or a software crash. The modifications required for implementing the invention are simple and inexpensive. Furthermore, the invention enables an easy adding of additional power management circuits.

In one embodiment of the invention, the plurality of power management circuits comprise one master power management circuit and at least one slave power management circuit, where the master power management circuit is able to control any slave power management circuit for powering the electronic device up and down in a regular manner. In another embodiment of the invention, however, the plurality of power management circuits may comprise as well a plurality of equal power management circuits. It is to be understood that a device may further comprise at least one power management circuit which is not capable of monitoring an entry of the condition itself, and which is thus not required to be able to change the state of the signal line.

The condition which requires powering down functional components of the electronic device may comprise a temperature exceeding a predetermined limit and/or other conditions, in particular other emergency conditions. According to the invention, any of the power management circuits of an electronic device may be able to change the state of the signal line. In one embodiment of the invention, the signal line is arranged to this end to carry an open drain type of signal which can be activated by any of the power management circuits.

In one embodiment of the invention, at least one pull-up resistor is connected between a power supply and the signal line. The at least one pull-up resistor may "pull-up" the signal line to the predetermined state until it is "pulled-down" again by one of the power management circuits. In case more than one pull-up resistor is provided, one or more of them may be employed for a respective "pull-up" of the signal line to the predetermined state.

In this case, one or more of the power management circuits, for example all slave power management circuits, may comprise a switching element, like a transistor. The signal line may then be connected via the respective switching element to ground. Such a power management circuit may then change a state of the signal line by changing a state of the switching element, for example by making a non-conductive transistor conductive by applying a suitable gate voltage.

Advantageously, the at least one pull-up resistor is connected via a switching element to the power supply. The switching element may then only be closed when at least one of the functional components of the electronic device is powered up. This avoids extra current consumption while the electronic device is in a power-off mode.

The at least one pull-up resistor and the switching element connecting the at least one pull-up resistor to a voltage supply can be realized as separate components and/or be comprised by one or more of the power management circuits, for example by a master power management circuit. This power management circuit may then be adapted to change a state of the signal line by changing a state of the switching element.

The predetermined state of the signal line may be for example an active state in contrast to an inactive state, corresponding for example to a high voltage on the signal line in contrast to a low voltage or the absence of a voltage.

If a master power management circuit and at least one slave power management circuit are employed, the master power management circuit may first drive the signal line actively high, for powering up the electronic device. Once the electronic device has been powered up, the master power management circuit may then release the signal line and cause a pull-up resistor to keep the signal line active, until it is deactivated by any one of the power management circuits.

In one embodiment of the invention, a state machine is implemented in a master power management circuit. This state machine may ensure that the master power management circuit is able to handle the signal in all operating modes.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

DETAILED DESCRIPTION OF THE INVENTION

Figure 1:
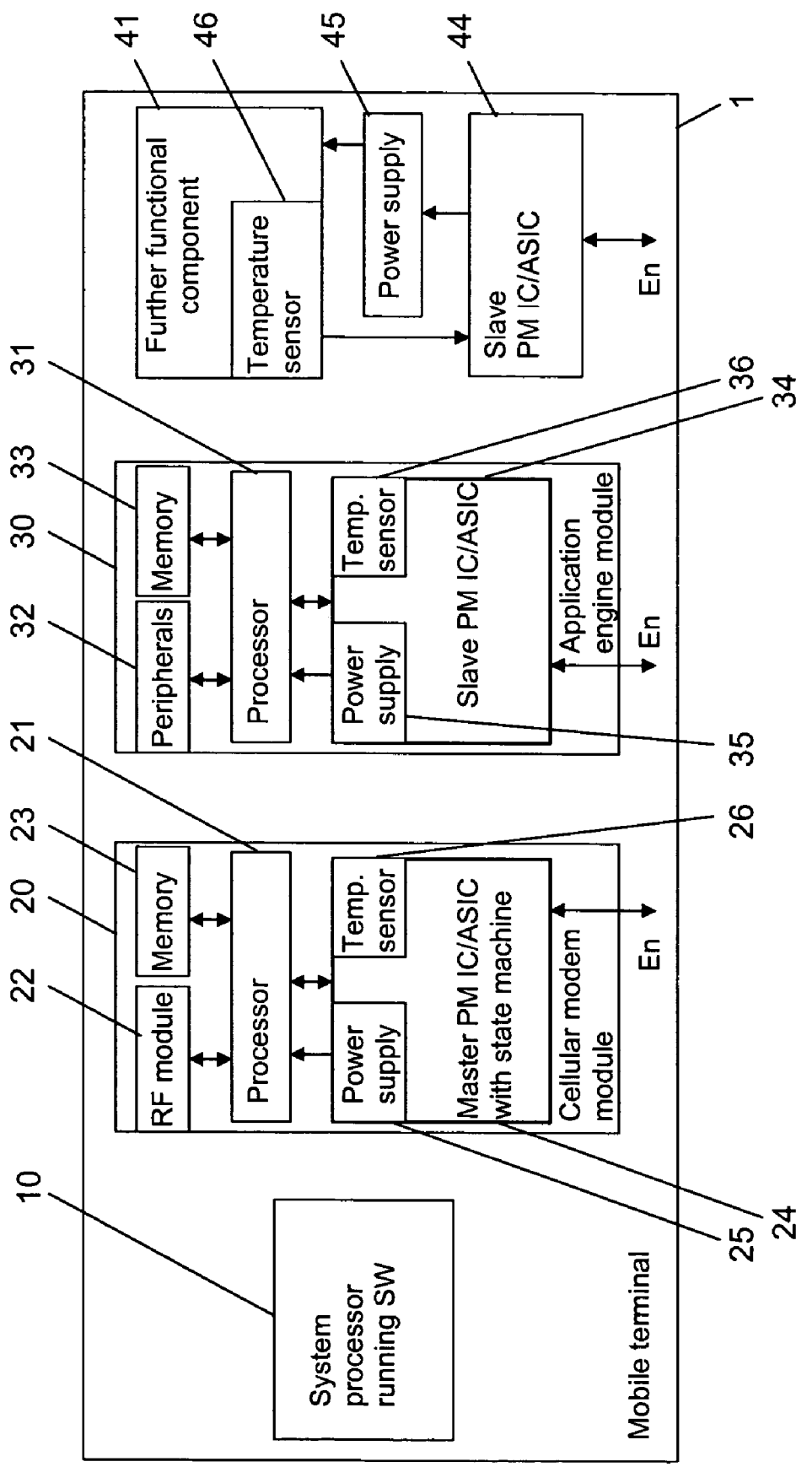
FIG. 1 is a schematic block diagram of an electronic device in which the invention can be implemented.

FIG. 1 is a schematic block diagram of a mobile terminal 1, in which an emergency switch-off of the power supply for various functional components can be realized in accordance with an embodiment of the invention. It is to be understood that the invention can equally be implemented in any other electronic device comprising a plurality of power management circuits.

The mobile terminal 1 comprises at least one system processor 10, which runs software (SW) for coordinating the operations in the mobile terminal 1.

The mobile terminal 1 moreover comprises a cellular modem module 20. The module 20 comprises a cellular modem processor 21 integrated on a chip as a first functional component, an RF module 22, memory components 23 integrated on chips and a master power management (PM) IC or ASIC 24. The cellular modem processor 21 controls the RF module 22, the memory components 23 and the master PM IC/ASIC 24. The master PM IC/ASIC 24 comprises a power management circuit (not shown separately), a power supply unit 25 for the cellular modem processor 21, a temperature sensor 26 and a state machine (not shown). It controls on the one hand the power supply unit 25 and on the other hand any power-up and power-down of the entire mobile terminal 1 in accordance with commands provided by one of the system processors 10. Further, the master PM IC/ASIC 24 is able to provide an interrupt signal to the cellular modem processor 21.

The mobile terminal 1 moreover comprises an application engine module 30. The module 30 comprises an application engine processor 31 integrated on a chip as a second functional component, various peripherals 32, a memory 33 integrated on a chip and a slave PM IC or ASIC 34. The application engine processor 31 controls the peripherals 32, the memory 33 and the slave PM IC/ASIC 34. The slave PM IC/ASIC 34 comprises a power management circuit (not shown separately), a power supply unit 35 for the application engine processor 31 and a temperature sensor 36. The slave PM IC/ASIC 34 controls the power supply unit 35. Further, the slave PM IC/ASIC 34 is able to provide an interrupt signal to the application engine processor 31.

It has to be noted that even though not indicated in the Figure, the PM IC/ASIC 24 of the cellular modem module 20 and the PM IC/ASIC 34 of the application engine module 30 might share some components, for example a regulator. Further, it has to be noted that in one of a plurality of alternative embodiments, the application engine module 30 could comprise a master PM IC/ASIC and the cellular modem module 20 a slave PM IC/ASIC.

The mobile terminal 1 may comprises in addition a plurality of other functional components to which a slave PM IC/ASIC is associated. By way of example, one further functional component 41 is depicted.

The further functional component 41 comprises a temperature sensor 46. A dedicated power supply unit 45 is connected to the further functional component 41. The temperature sensor 46 is connected to a second slave PM IC/ASIC 44, which is associated to the further functional component 41. The slave PM IC/ASIC 44 controls the power supply unit 45. By way of example, the power supply unit 45 and the temperature sensor 46 are not included in the slave PM IC/ASIC 44, in order to point out the possibility of different arrangements. The PM ICs/ASICs of some further functional components might not even have access to any temperature sensors at all.

It is to be understood that the mobile terminal 1 comprises various other components of a conventional mobile terminal, like a display and an audio transducer, etc., which are not depicted in FIG. 1.

Each of the temperature sensors 26, 36, 46 is able to detect whether a temperature in its environment exceeds a first or a second predetermined limit. The first, lower limit is a warning limit indicating that the temperature is approaching a critical value. The second, higher limit is a shut-down limit indicating that the temperature has actually reached a critical value.

Figure 3:
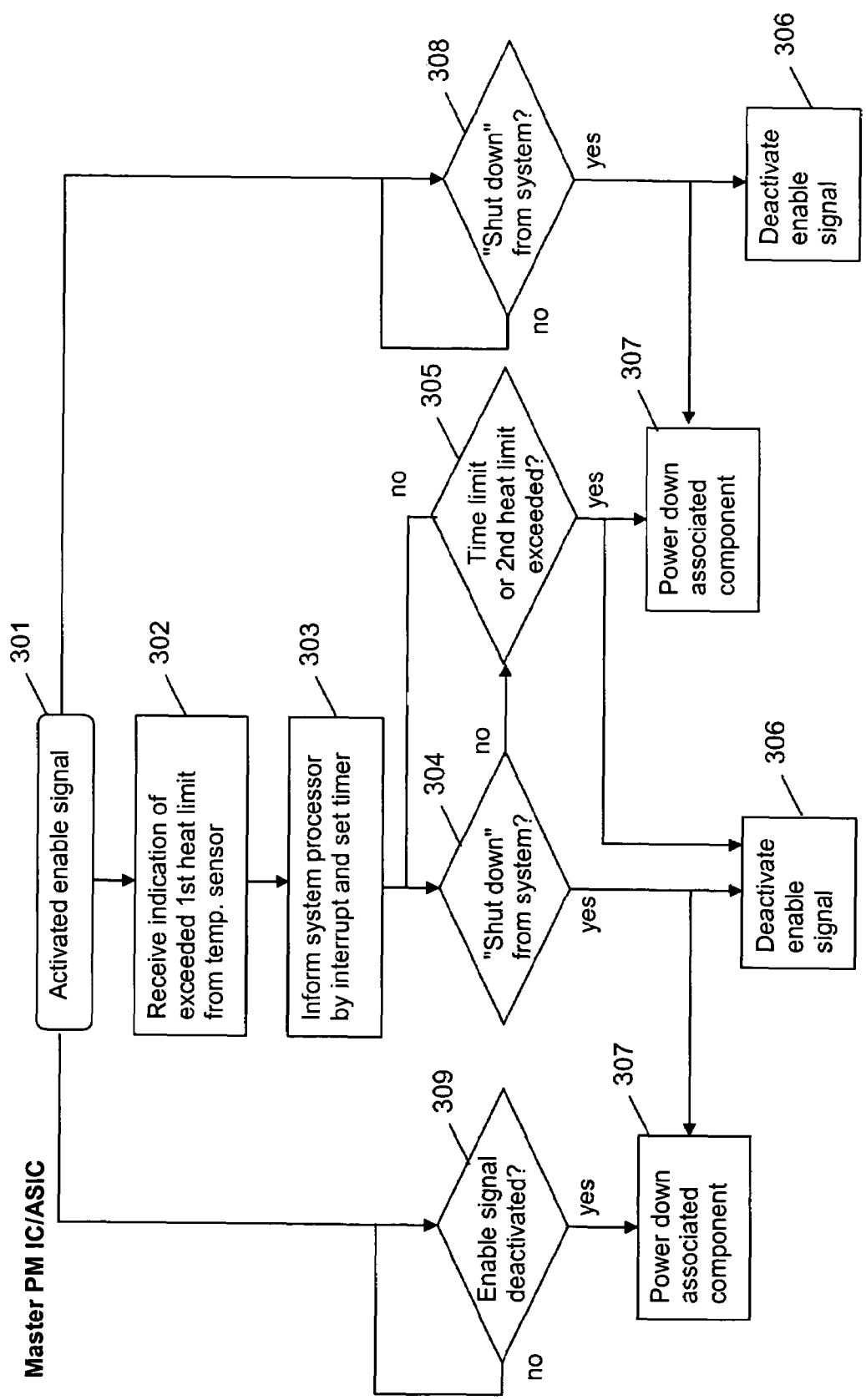
FIG. 3 is a flow chart illustrating the operation of a master power management circuit in the electronic device of FIG. 1.
Figure 4:
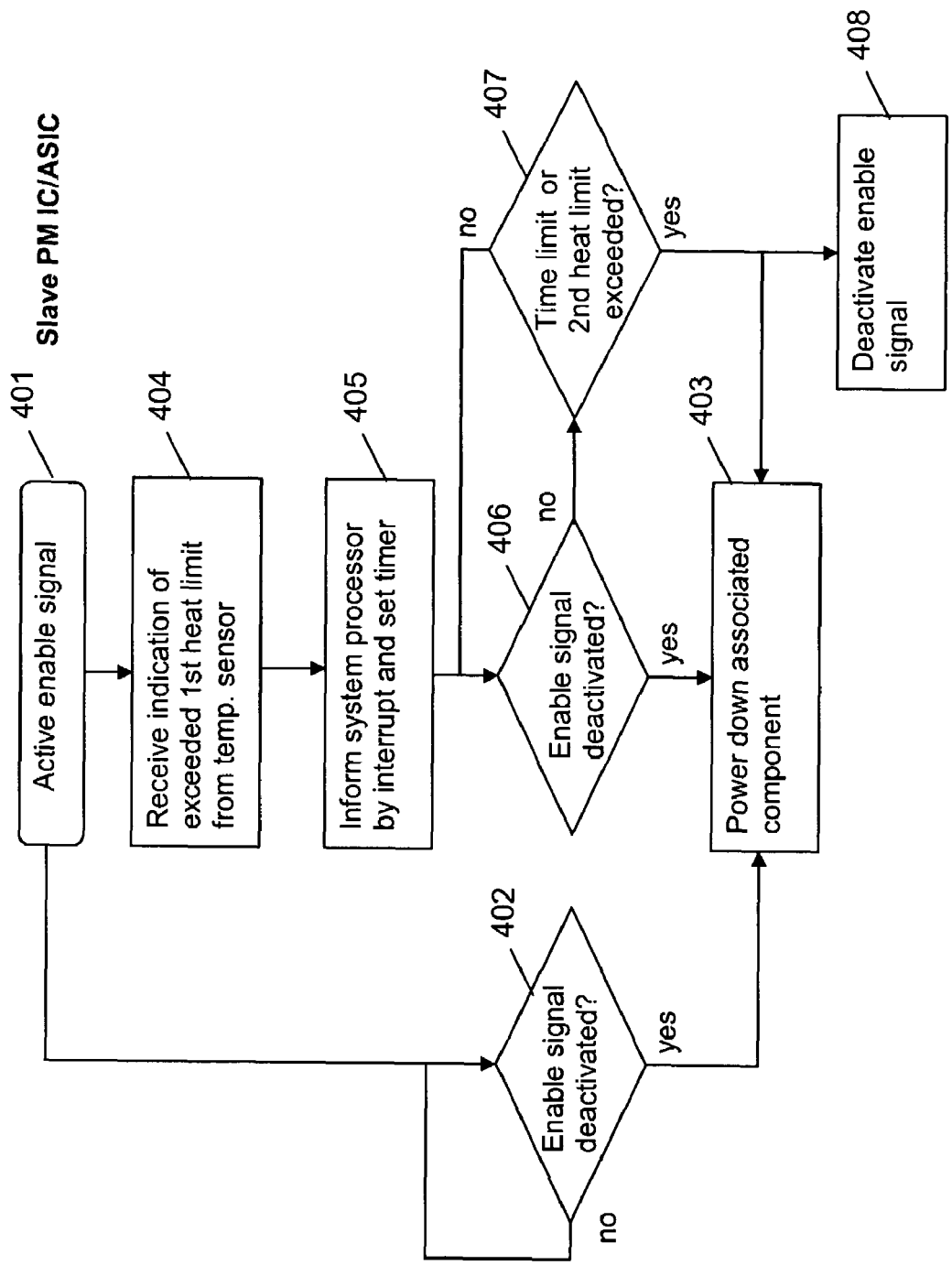
FIG. 4 is a flow chart illustrating the operation of a slave power management circuit in the electronic device of FIG. 1.

Each of the PM ICs/ASICs 24, 34, 44 is able to read a commonly available enable signal En and to deactivate an enable signal En, as will be explained with reference to FIGS. 2 to 4.

Figure 2:
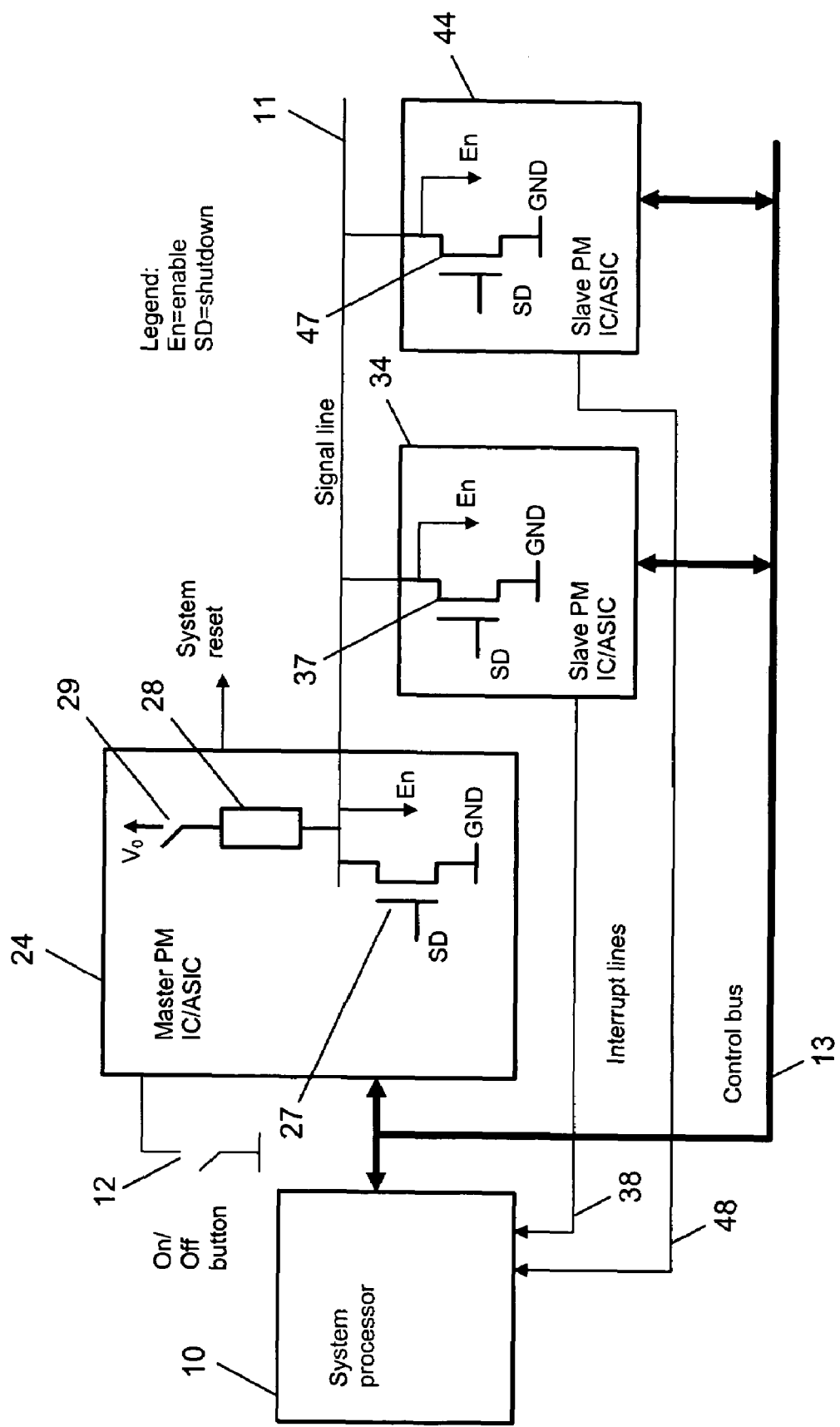
FIG. 2 is a schematic diagram showing details of the electronic device of FIG. 1 in accordance with an embodiment of the invention.

FIG. 2 is a schematic diagram illustrating details of the PM ICs/ASICs 24, 34, 44 and their interconnection.

The master PM IC/ASIC 24 and the slave PM ICs/ASICs 34, 44 are connected to each other via a signal line 11. Each slave PM IC/ASIC 34, 44 is moreover connected via a dedicated interrupt line 38, 48 to the system processor 10. In addition, a control bus 13 is provided, which can be accessed by the system processor 10, the master PM IC/ASIC 24 and each of the slave ICs/ASICs 34, 44. It has to be noted that the functions of the system processor 10 described herein could also be realized for instance by the cellular modem processor 21.

Each of the PM ICs/ASICs 24, 34, 44 comprises an n-type CMOS transistor 27, 37, 47. The drain of the transistor 27, 37, 47 is connected to the signal line 11 and the source of the transistor 27, 37, 47 is connected to ground GND. A shut-down signal SD can be applied to the gate of the transistor 27, 37, 47. As long as no shut down signal SD is applied to the gate of the transistor 27, 37, 47 of any of the PM ICs/ASICs 24, 34, 44, the signal line 11 is disconnected from ground GND, while as soon as a shut down signal SD is applied to the gate of the transistor 27, 37, 47 of one of the PM ICs/ASICs 24, 34, 44, this transistor 27, 37, 47 forms a conductive connection between the signal line 11 and ground GND. The resulting state of the signal line 11 represents an enable signal En for the PM ICs/ASICs 24, 34, 44. A high voltage on the signal line 11 represents an active enable signal En, while a low voltage of the signal line 11 represents an inactive enable signal En.

The master PM IC/ASIC 24 comprises in addition a pull-up resistor 28, which is connected on the one hand via a switch 29 to a supply voltage $V_0$, for instance a battery voltage, and on the other hand to the signal line 11. The signal line 11 is moreover arranged within the master PM IC/ASIC 24 to provide a shut-down signal SD for the master PM IC/ASIC 24. An On/Off button 12 of the mobile terminal 1 is connected directly to the master PM IC/ASIC 24.

It is to be understood that beside the depicted details, the PM ICs/ASICs 24, 34, 44 may be implemented in the same manner as well-known conventional master and slave PM ICs/ASICs.

When a user presses the On/Off button 12 to turn the mobile terminal 1 on, the master PM IC/ASIC 24 closes the switch 29 for connecting the supply voltage $V_0$ via the pull-up resistor 28 to the signal line 11. Thereby, an enable signal En is activated on the signal line 11, that is, a high voltage can be detected on the signal line 11. The master PM IC/ASIC 24 moreover causes the power supply unit 25 to power up the associated cellular modem processor 21.

The slave ICs/ASICs 34, 44 detect the activated enable signal En on the signal line 11 and cause as well a powering up of the respectively associated component 31, 41 by the respectively associated power supply unit 35, 45. Finally, the master PM IC/ASIC 24 releases a system reset signal. Thereupon, the system processor 10 boots up.

Alternatively, the master PM IC/ASIC 24 could drive the enable signal En at first actively high. When the system reset signal is released, the PM IC/ASIC 24 then releases the enable signal, and the enable signal changes to an open-drain type, which is kept active by the pull-up resistor 28.

Whenever the mobile terminal 1 needs to be shut down regularly, for example upon request of a user pressing the On/Off button 12 again, the system processor 10 commands the master PM IC/ASIC 24 via the control bus 13 to shut down the system. As a consequence, the master PM IC/ASIC 24 deactivates the enable signal En on the signal line 11. To this end, the master PM IC/ASIC 24 opens the switch 29 and drives the signal En actively low by providing a shut down signal SD to the gate of the transistor 27. As a result, the transistor 27 becomes conductive and the high voltage on the signal line 11 representing an activated enable signal En is lowered to represent a deactivated enable signal En. Thereupon, all PM ICs/ASICs 24, 34, 44 shut down the power supply to their associated components 21, 31, 41.

The operation of the master PM IC/ASIC 24 in case of an emergency shut-down will now be described with reference to the flow chart of FIG. 3.

As a starting point, the mobile terminal 1 is assumed to be powered up and the open drain type enable signal En is assumed to be activated in the master PM IC/ASIC 24 by a closed switch 29 (step 301).

When the master PM IC/ASIC 24 receives an indication from the temperature sensor 26 that the temperature in the cellular modem module 20 exceeds the first predetermined limit (step 302), the master PM IC/ASIC 24 informs the system processor via the control bus 13 and starts a timer (step 303).

Then, the master PM IC/ASIC 24 monitors whether a "shut down" command is received from the system processor 10.

If such a "shut down" command is received within a predetermined period of time monitored by the timer and before the temperature sensor 26 provides an indication that the temperature in the cellular modem module 20 exceeds the second predetermined limit (steps 304, 305), the master PM IC/ASIC 24 deactivates the enable signal En on the signal line 11 as described above with reference to FIG. 2 (step 306). Moreover, the master PM IC/ASIC 24 causes the power supply unit 25 to power down the cellular modem processor 21 (step 307), possibly after having provided an interrupt to the cellular modem processor 21. As will become apparent further below, as a consequence the whole system shuts down.

If no "shut down" command is received from the system processor 10 within the predetermined period of time or if the second temperature limit is exceeded before a "shut down" command is received (steps 304, 305), the master PM IC/ASIC 24 does not wait any longer for a "shut down" command, but assumes that a regular powering down is not possible for some reason. For example, the processing in the system processor 10 might currently be too slow or a software crash might have occurred at the system processor 10, either preventing a timely reaction by the system processor 10. Therefore, the master PM IC/ASIC 24 deactivates the enable signal on the signal line 11 as described above with reference to FIG. 2 (step 306) and causes the power supply unit 25 to power down the cellular modem processor 21 (step 307), possibly after having provided an interrupt to the cellular modem processor 21. As will become apparent further below, as a consequence the whole system shuts down.

As long as no indication of an exceeded temperature limit is received from the temperature sensor 26, the master PM IC/ASIC 24 checks whether a differently caused "shut-down" command is received from the system processor 10 via the control bus 13 (step 308) or whether the enable signal En on the signal line 11 is disabled by a slave PM IC/ASIC 34, 44 (step 309).

In case the PM IC/ASIC 24 detects a receipt of a "shut-down" signal (step 308), the master PM IC/ASIC 24 deactivates the enable signal on the signal line 11 as described above with reference to FIG. 2 (step 306) and causes the power supply unit 25 to power down the cellular modem processor 21 (step 307), possibly after having provided an interrupt to the cellular modem processor 21. As will become apparent further below, as a consequence the whole system shuts down.

In case the PM IC/ASIC 24 detects that the enable signal En is deactivated (step 309), this is interpreted by the master PM IC/ASIC 24 as a shut down signal. Therefore, the master PM IC/ASIC 24 causes the power supply unit 22 to shut down the power supply to the cellular modem processor 21 (step 307), possibly after having provided an interrupt to the cellular modem processor 21.

The state machine ensures that the master PM IC/ASIC 24 is able to differentiate between enable signals in different operating modes, in particular to differentiate between a deactivated enable signal En before the system is powered up and an enable signal En which becomes deactivated after the system has been powered up. In the first case, the system has to be powered up in spite of the deactivated enable signal En, while in the latter case, the associated cellular modem processor 21 has to be powered down because of the inactive enable signal En.

The operation of a respective slave PM IC/ASIC 34, 44 in case of an emergency shut-down will now be described with reference to the flow chart of FIG. 4.

As a starting point, the enable signal En on the signal line 11 is assumed to be active, the switch 29 in the master PM IC/ASIC 24 being closed. The slave PM IC/ASIC 34, 44 has detected the enable signal En and powered up its associated functional component 31, 41. (step 401)

The slave PM IC/ASIC 34, 44 monitors the state of the enable signal En on the signal line 11 and a receipt of information from the temperature sensor 36, 46.

In case the slave PM IC/ASIC 34, 44 detects that the enable signal En on the signal line 11 becomes deactivated (step 402), the slave PM IC/ASIC 34, 44 immediately causes the associated power supply unit 35, 45 to shut down the power supply to the application engine processor 31 or to the further functional component 41, respectively (step 403), possibly after having provided an interrupt to the respectively associated functional component 31, 41.

In case the slave PM IC/ASIC 34, 44 receives an indication from the comprised temperature sensor 36, 46 that the temperature on the PM IC/ASIC 34, 44 or in the further functional component 41, respectively, exceeds the first predetermined limit (step 404), the slave PM IC/ASIC 34, 44 informs the system processor 10 by means of an interrupt via the associated interrupt line 38, 48 and starts a timer (step 405).

If the system processor 10 is working properly, it processes the received interrupt and sends a "shut-down" command to the master PM IC/ASIC 24 for causing a shut-down of all functional components 21, 31, 41 of the mobile terminal 1. As indicated with reference to FIG. 3, the master PM IC/ASIC 24 deactivates upon receipt of such a "shut-down" command the enable signal En on the signal line 11 (step 306).

The slave PM IC/ASIC 34, 44 monitors in the meantime whether the enable signal En on the signal line 11 is deactivated. If the enable signal En is deactivated within a predetermined period of time registered by the timer and before the temperature sensor 36, 46 provides an indication that the monitored temperature exceeds the second predetermined limit (steps 406, 407), the slave PM IC/ASIC 34, 44 causes the power supply unit 35, 45 to power down the application engine processor 31 or the further functional component 41, respectively (step 403), possibly after having provided an interrupt to the respectively associated functional component 31, 41.

If the enable signal En is not deactivated within the predetermined period of time or if the temperature sensor 36, 46 provides an indication that the monitored temperature exceeds the second predetermined limit (steps 406, 407), the slave PM IC/ASIC 34, 44 does not wait any longer for a deactivated enable signal En, but assumes that a regular powering down is currently not possible for some reason. Therefore, the slave PM IC/ASIC 34, 44 deactivates the enable signal En on the signal line 11 itself (step 408) by providing a shut down signal to the gate of the transistor 37, 47. As a result, the transistor 37, 47 becomes conductive and the high voltage on the signal line 11 representing an activated enable signal En is lowered to represent a deactivated enable signal En.

Due to the deactivated enable signal En, also the master PM IC/ASIC 24 and the other slave PM ICs/ASICs 44, 34 monitoring the signal line 11 know that the associated functional components should be shut off immediately (steps 309 and 307 or steps 402 and 403).

The slave PM IC/ASIC 34, 44 now causes the associated power supply unit 35, 45 to power down the associated application engine processor 31 or the associated further functional component 41, respectively (step 403), possibly after having provided an interrupt to the respectively associated functional component 31, 41.

Thus, any of the PM IC/ASIC 24, 34, 44 is able to shut the whole system down in an emergency case.

It has to be noted that the pull-up resistor 28 is not necessarily included in the master PM IC/ASIC 24, but could also be arranged at some other place, for example in any slave PM IC/ASIC or external to master and slave PM ICs/ASICs. In this case, the master PM IC/ASIC 24 uses exclusively the transistor 27 for deactivating the enable signal En on the signal line 11. There may also be more than one pull-up resistor. In case a plurality of pull-up resistors is provided, one, some or all of them may actually be used.

In summary, not only the master power management circuit but also the slave power management circuits are enabled in the presented embodiment of the invention to cause a change of state of an enable signal. At the same time, not only the slave power management circuits but also the master power management circuit is able to react to a change of state of the enable signal. While in a conventional implementation, the slave power management circuits have no means to cause the master power management circuit to shut down components, the slave power management circuits of the presented embodiment are thus able to cause the master power management circuit directly to shut down an associated functional component. As a result, the provided emergency system is more robust compared to conventional emergency systems.

While there have been shown and described and pointed out fundamental novel features of the invention as applied to a preferred embodiment thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. An electronic device comprising at least two power management circuits and a signal line connecting said at least two power management circuits;

wherein each of said at least two power management circuits is adapted to control a power supply to at least one functional component of said electronic device associated to said power management circuit;

wherein each of said at least two power management circuits is adapted to detect a condition which requires powering down functional components of said electronic device;

wherein each of said at least two power management circuits is adapted to directly set said signal line to a predetermined state, in case said power management circuit detects a condition which requires powering down functional components of said electronic device;

wherein each of said at least two power management circuits is adapted to monitor a state of said signal line; and wherein each of said at least two power management circuits is adapted to power down all functional components associated to it upon detection of said predetermined state of said signal line.

2. The electronic device according to claim 1, wherein one of said at least two power management circuits is a master power management circuit, wherein at least one other of said at least two power management circuits is a slave power management circuit, and wherein said master power management circuit is adapted to control said at least one slave power management circuit.

3. The electronic device according to claim 1, wherein said condition which requires powering down functional components of said electronic device comprises at least a temperature exceeding a predetermined limit.

4. The electronic device according to claim 1, wherein said predetermined state of said signal line is given in case of an active signal on said signal line, and wherein said signal line is arranged to carry an open drain type of signal which can be activated by any of said at least two power management circuits.

5. The electronic device according to claim 1, further comprising at least one pull-up resistor which is connected between a power supply and said signal line.

6. The electronic device according to claim 5, wherein at least one of said power management circuits comprises a switching element, wherein said signal line is further connected via said switching element to ground, and wherein said at least one power management circuit is adapted to change a state of said signal line by changing a state of said switching element.

7. The electronic device according to claim 6, wherein said switching element is a transistor.

8. The electronic device according to claim 5, wherein said at least one pull-up resistor is connected via a switching element to said power supply, which switching element is only closed when at least one of said functional components is powered up.

9. The electronic device according to claim 8, wherein one of said power management circuits comprises said at least one pull-up resistor and said switching element, and wherein said power management circuit is adapted to change a state of said signal line by changing a state of said switching element.

10. The electronic device according to claim 1, wherein at least one of said power management circuits comprises a state machine, which state machine defines a handling of a signal on said signal line.

11. A plurality of power management circuits each comprising:
a signal line terminal enabling a connection to a signal line common to each power management circuit; and
a power supply terminal enabling a control of a power supply to a functional component associated to said power management circuit;
wherein said power management circuit is adapted to detect a condition which requires powering down a functional component associated to said power management circuit;
wherein said power management circuit is adapted to directly set a signal line connected to said signal line terminal to a predetermined state, in case said power management circuit detects a condition which requires powering down a functional component associated to said power management circuit;
wherein said power management circuit is adapted to monitor a state of a signal line connected to said signal line terminal; and
wherein said power management circuit is adapted to power down a functional component associated to said power management circuit upon detection of said predetermined state of a signal line connected to said signal line terminal.

12. A chip comprising at least one functional component and a power management circuit adapted to control a power supply to said at least one functional component,
wherein said power management circuit is adapted to detect a condition which requires powering down said at least one functional component;
wherein said power management circuit is adapted to directly set a signal line to a predetermined state, in case said power management circuit detects a condition which requires powering down said at least one functional component, wherein said signal line is configured so as to be common with a signal line of at least one other said chip;
wherein said power management circuit is adapted to monitor a state of a signal line; and
wherein said power management circuit is adapted to power down said at least one functional component upon detection of said predetermined state of said signal line.

13. A method for operating an electronic device comprising at least two power management circuits and a signal line interconnecting said at least two power management circuits, wherein at least one functional component of said electronic device is associated to each of said at least two power management circuits, and wherein each of said at least two power management circuits is adapted to control a power supply to said at least one associated functional component, said method comprising at each of said at least two power management circuits:
monitoring a state of said signal line;
monitoring an entry of a condition which requires powering down functional components of said electronic device;
directly setting said signal line to a predetermined state, in case a condition which requires a powering down of said electronic device is detected; and
powering down all functional components associated to said power management circuit upon detection of said predetermined state of said signal line.

14. A plurality of power management circuits each comprising:
a signal line terminal enabling a connection to a signal line common to each power management circuit; and
a power supply terminal enabling a control of a power supply to a functional component associated to said power management circuit;
wherein said power management circuit has means for detecting a condition which requires powering down a functional component associated to said power management circuit;
wherein said power management circuit has means for directly setting a signal line connected to said signal line terminal to a predetermined state, in case said power management circuit detects a condition which requires powering down a functional component associated to said power management circuit;
wherein said power management circuit has means for monitoring a state of a signal line connected to said signal line terminal; and
wherein said power management circuit has means for powering down a functional component associated to said power management circuit upon detection of said predetermined state of a signal line connected to said signal line terminal.

* * * * *